(12) United States Patent
Reuter et al.

(10) Patent No.: US 11,034,205 B2
(45) Date of Patent: Jun. 15, 2021

(54) CONCURRENT LEVELING SYSTEM FOR A VEHICLE

(71) Applicant: BeijingWest Industries Co., Ltd., Beijing (CN)

(72) Inventors: David Fredrick Reuter, Beavercreek, OH (US); Daniel Norbert Borgemenke, Springboro, OH (US); Bryan P. Riddiford, Dayton, OH (US); Brian Marc D'Amico, Dayton, OH (US); Laurene Marie Dowe, Waynesville, OH (US); Martin H. Seim, Liberty Township, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 148 days.

(21) Appl. No.: 16/136,192

(22) Filed: Sep. 19, 2018

(65) Prior Publication Data
US 2019/0111753 A1 Apr. 18, 2019

Related U.S. Application Data

(60) Provisional application No. 62/574,195, filed on Oct. 18, 2017.

(51) Int. Cl.
*B60G 17/052* (2006.01)
*B60G 17/015* (2006.01)
(Continued)

(52) U.S. Cl.
CPC ....... *B60G 17/0155* (2013.01); *B60G 17/018* (2013.01); *B60G 17/019* (2013.01);
(Continued)

(58) Field of Classification Search
CPC ............... B60G 17/018; B60G 17/019; B60G 17/0155; B60G 17/0408; B60G 17/0525; B60G 17/0565; B60G 11/27; B60G 11/30
(Continued)

(56) References Cited

U.S. PATENT DOCUMENTS 4,465,297 A * 8/1984 Yamahara .......... B60G 17/0408
280/6.157
4,799,707 A   1/1989 Buma et al.
(Continued)

FOREIGN PATENT DOCUMENTS

CN   102161302 A   8/2011
CN   103270320 A   8/2013
(Continued)

OTHER PUBLICATIONS

First Office Action and search report dated Dec. 9, 2019 for counterpart Chinese patent application No. 201811203218.1, along with machine EN translation downloaded from EPO.

*Primary Examiner* — Christopher P Schwartz
(74) *Attorney, Agent, or Firm* — William H. Honaker; Dickinson Wright PLLC

(57) ABSTRACT

A concurrent leveling system includes a pressurized air source. A manifold block, having a body defining an air feed inlet, is disposed between air springs and the pressurized air source. The body includes front and rear suspension valves. Each of the suspension valves defines a suspension valve orifice having a first predetermined diameter. The body includes at least one restrictor valve parallel to and in fluid communication with the front suspension valves. The at least one restrictor valve includes a first check valve and a first blocker valve orifice defining a first orifice diameter. The first check valve and the first blocker valve orifice are disposed parallel to one another and in series with the front suspension valves and in fluid communication with the air (Continued)

feed inlet and the front suspension valves for reducing fluid back flow to allow the vehicle to be lowered in nominal loading conditions.

8 Claims, 10 Drawing Sheets

(51) Int. Cl.
*B60G 17/018* (2006.01)
*B60G 17/019* (2006.01)
*B60G 17/04* (2006.01)
*B60G 17/056* (2006.01)

(52) U.S. Cl.
CPC ..... *B60G 17/0408* (2013.01); *B60G 17/0525* (2013.01); *B60G 17/0565* (2013.01); *B60G 2400/51* (2013.01); *B60G 2400/51222* (2013.01); *B60G 2500/2021* (2013.01); *B60G 2500/2042* (2013.01); *B60G 2500/2044* (2013.01); *B60G 2500/302* (2013.01); *B60G 2600/66* (2013.01); *B60G 2600/73* (2013.01); *B60G 2800/914* (2013.01)

(58) Field of Classification Search
USPC ................................ 267/64.16, 64.21–64.28; 280/5.507–5.515, 6.157; 137/596; 701/37
See application file for complete search history.

(56) References Cited

U.S. PATENT DOCUMENTS

| | | | | |
|---|---|---|---|---|
| 4,911,617 | A * | 3/1990 | Buma | B60G 17/052 417/439 |
| 5,601,307 | A * | 2/1997 | Heyring | B60G 17/015 280/6.157 |
| 7,441,789 | B2 | 10/2008 | Geiger et al. | |
| 7,484,147 | B2 | 1/2009 | Sumino | |
| 7,607,672 | B2 | 10/2009 | Suzuki et al. | |
| 8,155,835 | B2 | 4/2012 | Holbrook | |
| 8,905,071 | B2 * | 12/2014 | Coombs | F15B 13/0853 137/596 |
| 9,010,785 | B2 | 4/2015 | Gocz et al. | |
| 9,199,524 | B2 | 12/2015 | Stabenow | |
| 10,442,267 | B2 * | 10/2019 | Riddiford | B60G 17/0523 |
| 10,596,873 | B2 * | 3/2020 | Reuter | B60G 17/056 |
| 10,703,159 | B2 * | 7/2020 | Riddiford | B60G 17/0155 |
| 2013/0320645 | A1 | 12/2013 | Gall | |
| 2014/0333038 | A1 * | 11/2014 | Gocz | B60G 17/0528 280/6.157 |
| 2015/0151603 | A1 * | 6/2015 | Kondo | B60G 17/017 280/6.157 |
| 2017/0036505 | A1 | 2/2017 | Bohn et al. | |
| 2017/0267046 | A1 | 9/2017 | Reuter et al. | |
| 2019/0263212 | A1 * | 8/2019 | Ito | B60G 17/056 |

FOREIGN PATENT DOCUMENTS

| | | |
|---|---|---|
| CN | 106976373 A | 7/2017 |
| CN | 107009838 A | 8/2017 |

* cited by examiner

CONCURRENT LEVELING SYSTEM FOR A VEHICLE

CROSS REFERENCE TO RELATED APPLICATION

This application claims the benefit of provisional application Ser. No. 62/574,195 filed on Oct. 18, 2017, the entire disclosure of which are incorporated herein by reference in its entirety.

BACKGROUND OF THE INVENTION

1. Field of the Invention

The present invention generally relates to a concurrent leveling system and, more particularly, a concurrent leveling system for a vehicle.

2. Description of the Prior Art

Concurrent leveling systems are known in the art for use on automotive vehicles to provide smooth, pulse-free raising and lowering of the front and rear ends of the vehicle with minimal switching required between separate front and rear axle airflow control. Such a concurrent leveling system typically include a plurality of air springs, each for interconnecting the body and one of the wheel's suspension members of the automotive vehicle for damping relative forces between the body and the wheels, and for adjusting the height of the automotive vehicle.

In order to control the airflow in the concurrent leveling system, the air springs are commonly connected via one or more air lines to a manifold block of the air management system. The concurrent leveling system may also include a compressor or pump including a motor which may be coupled to the manifold block to provide air to fill the air springs. When exhausting air from the air springs after they have been inflated, it is desirable to provide for a high flow rate for lowering the vehicle.

A typical non-concurrent, high exhaust flow leveling system is disclosed in U.S. Patent Publication 2017/0267046. The leveling system includes a pressurized air source for supplying air to the front air springs and the rear air springs. A manifold block, having a body defining an air feed inlet, is disposed between the air springs and the pressurized air source for controlling the fluid flow from the pressurized air source to the air springs. It should be noted that the air feed inlet may also serve as an air feed outlet to allow for expelling air from the air springs. The body of the manifold block includes a plurality of pneumatic suspension valves having a pair of front suspension valves and a pair of rear suspension valves. Each one of the suspension valves defines a suspension valve orifice having a first predetermined diameter for inhibiting and allowing the air to be conveyed from the pressurized air source through the manifold block.

U.S. Pat. No. 6,481,452 discloses a hydraulic valve assembly. The hydraulic valve assembly includes a housing disposed on a center axis and extending between a first opened end and a second opened end. The housing defines a channel extending between the first opened end and the second end. A stator is attached to the housing. An armature is slidably disposed in the channel and spaced from the stator. A first elastic member disposed between the stator and the armature to bias the armature axially away from the stator. A valve seat is disposed in the channel spaced from the armature and is attached to the housing. The valve seat defines an aperture for allowing fluid to flow through the valve seat. The housing defines at least one hole disposed between the valve seat and the armature. The housing is in fluid communication with the channel to allow fluid flow through the housing from the second opened end. At least one plunger including a first plunger and a second plunger is dispose in the channel for movement with the armature in response to a magnetic field for controlling fluid flow through the aperture of the valve seat. The first plunger and the second plunger are disposed in tandem and spaced from one another in the channel. The first plunger is attached to the armature. The second plunger is spaced from the second opened end and adjacent to the first plunger and defining an opening for allowing fluid flow through the second plunger. The second plunger includes a projection disposed about the opening and extends outwardly from the second plunger toward the second opened end to a distal end to engage the valve seat. The projection and the second plunger define a conduit disposed in fluid communication with the opening and the hole for allowing fluid flow through the second plunger. A cap is disposed in the channel, spaced from the housing, and attached to the armature. The cap extends about the first plunger and the second plunger for axial movement with the armature in response to the magnetic field and to retain the first plunger and the second plunger in the channel.

Typically, the hydraulic valve assembly, e.g. a two-stage prime valve, as disclosed in the '452 patent requires two different magnetic forces to move the first plunger and the second plunger. More specifically, a minimal magnetic force is used to move the first plunger from a closed position to an opened position. To move the second plunger, a second magnetic force larger than the minimal magnetic force is required to move the second plunger from a first position to a second position.

In addition, it is well understood that on most vehicle, the front end of the vehicle is the heaviest. This is largely due to the location of the engine and transmission. When lowering a vehicle, the heavier weight causes higher pressure in the manifold block to be created. This higher pressure does not permit the lighter rear end of the vehicle to be lowered at the same rate as the front end. In fact, the higher pressure in the front air springs may cause the rear end of the vehicle to lift because the front and the rear axles are merged in the pneumatic manifold block. Accordingly, the vehicle will tilt with the front end of the vehicle being tilted downwards and the rear end of the vehicle being tilted upwards to an unacceptable level if left on its own. In other words, the back pressure in the manifold block can slow down or even reverse the air flow in the rear end of the vehicle causing the rear end of the vehicle to not lower at all or to actually rise up thereby causing the vehicle to tilt at an uncomfortable angle. Thus, there remains a need for improvement of the concurrent leveling system to provide smooth raising and lowering of the vehicle.

SUMMARY OF THE INVENTION

The invention in its broadest aspect provides a concurrent leveling system that is able to smoothly and quickly raise or lower axle height. In addition, the invention also provides the development of a cost-effective pneumatic circuitry that allows the uses of smaller, high value ABS and ESC valves and components converted for use in a pneumatic circuit.

The concurrent leveling system includes a pressurized air source for supplying air to the front air springs and the rear air springs. A manifold block, having a body defining an air feed inlet, is disposed between the air springs and the pressurized air source for controlling the fluid flow from the pressurized air source to the air springs. The body of the manifold block includes a plurality of pneumatic suspension valves having a pair of front suspension valves and a pair of rear suspension valves. Each one of the suspension valves defines a suspension valve orifice having a first predetermined diameter for inhibiting and allowing the air to be conveyed from the pressurized air source through the manifold block. The body includes at least one restrictor valve disposed in series with the front suspension valves and in fluid communication with the front suspension valves for reducing fluid back flow to allow the vehicle to be lowered in nominal loading conditions.

It is a further aspect of the present invention to provide a manifold block for a concurrent leveling system for a vehicle having a pair of front air springs and a pair of rear air springs. The manifold block includes a body defining an air feed inlet disposed between the air springs and a pressurized air source for controlling the fluid flow from the pressurized air source to the air springs. The body including a plurality of pneumatic suspension valves having a pair of front suspension valves and a pair of rear suspension valves. The suspension valves each defines a suspension valve orifice having a first predetermined diameter for inhibiting and allowing the air to be conveyed from the pressurized air source through the manifold block. The body includes at least one restrictor valve disposed in series with the front suspension valves and in fluid communication with the front suspension valves for reducing fluid back flow to allow the vehicle to be lowered in nominal loading conditions.

It is a further aspect of the present invention to provide a pneumatic valve assembly that utilizes a single magnetic force to move the first plunger from the closed position to the opened position and the second plunger from the first position to the second position. In addition, the present invention provides the pneumatic valve assembly that has a quiet operation as the first plunger is moved from the closed position to the opened position and the second plunger is moved from the first position to the second position.

The pneumatic valve assembly includes a housing disposed on a center axis and extending between a first opened end and a second opened end. The housing defines a channel extending between the first opened end and the second opened end. A stator is attached to the housing. An armature is slidably disposed in the channel and spaced from the stator. A first elastic member disposed between the stator and the armature to bias the armature axially away from the stator. A valve seat is disposed in the channel spaced from the armature and is attached to the housing. The valve seat defines an aperture for allowing fluid to flow through the valve seat. The housing defines at least one hole disposed between the valve seat and the armature. The housing is in fluid communication with the channel to allow fluid flow through the housing from the second opened end.

At least one plunger including a first plunger and a second plunger is dispose in the channel for movement with the armature in response to a magnetic field for controlling fluid flow through the aperture of the valve seat. The first plunger and the second plunger are disposed in tandem and spaced from one another in the channel. The first plunger is attached to the armature. The second plunger is spaced from the second opened end and adjacent to the first plunger and defining an opening for allowing fluid flow through the second plunger. The second plunger includes a projection disposed about the opening and extends outwardly from the second plunger toward the second opened end to a distal end to engage the valve seat. The projection and the second plunger define a conduit disposed in fluid communication with the opening and the hole for allowing fluid flow through the second plunger. A cap is disposed in the channel, spaced from the housing, and attached to the armature. The cap extends about the first plunger and the second plunger for axial movement with the armature in response to the magnetic field and to retain the first plunger and the second plunger in the channel. The cap includes a top portion attached to the armature and a bottom portion defines a perforation to receive the projection to allow the distal end of the projection to engage the valve seat to prevent fluid flow through the hole of the valve seat. The cap includes an intermediate stop portion extending at an oblique angle relative to the center axis between the top portion and the bottom portion to connect the top portion with the bottom portion and to engage the second plunger in response to the magnetic field.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
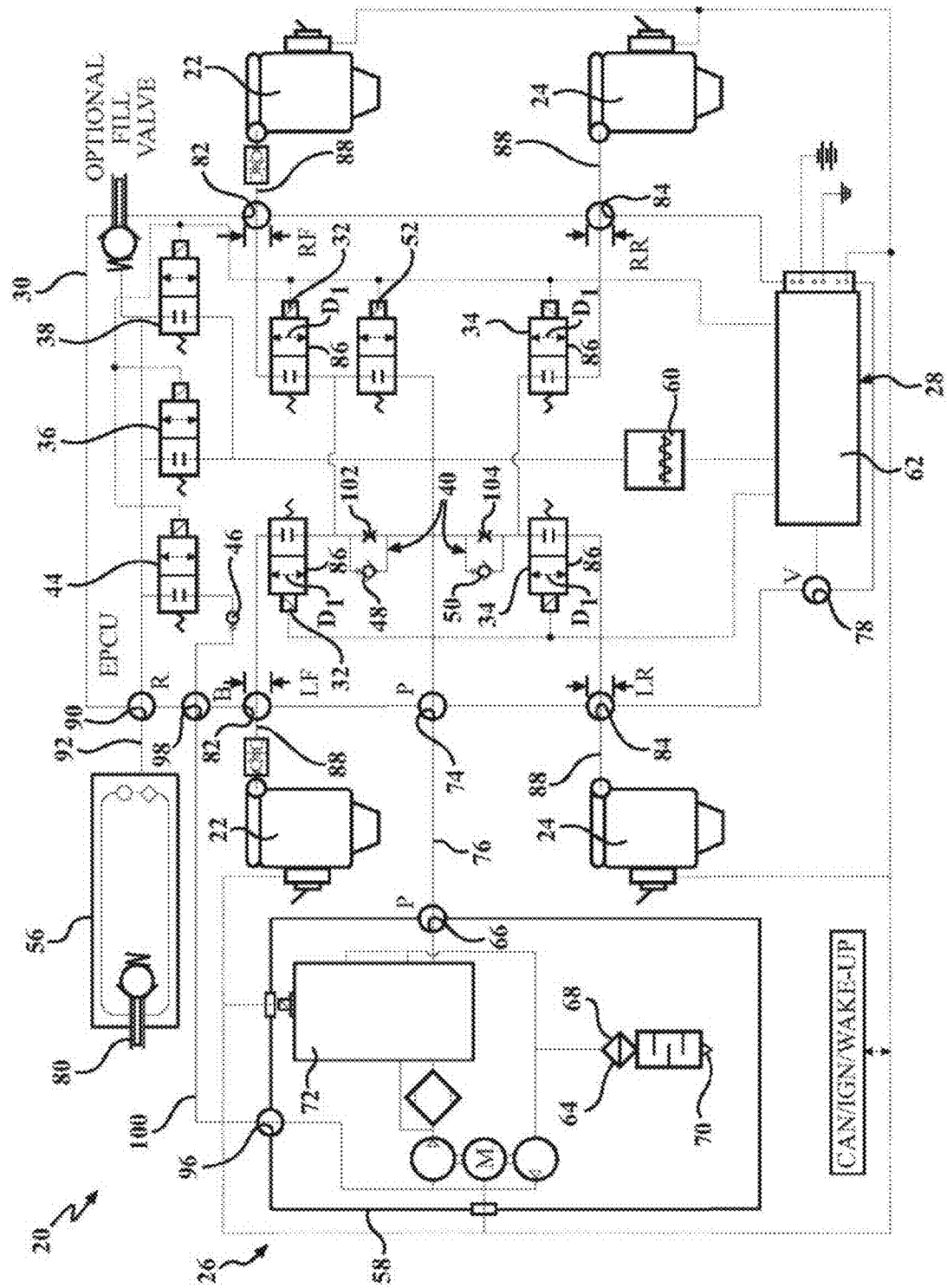
FIG. 1 is a schematic view of an embodiment of the concurrent leveling system.

Referring to the Figures, wherein like numerals indicate corresponding parts throughout the several views, a concurrent leveling system 20 for a vehicle is generally shown in FIG. 1.

Concurrent leveling refers to one which pneumatically raises and lowers a vehicle in a smooth fashion without switching air spring blocker valves. Typically, the concurrent leveling system 20 is implemented in a vehicle having a front end, a rear end, and a plurality of wheels, e.g. four wheels, including a pair of front wheels and a pair of back wheels. A plurality of air springs 22, 24 is connected to the vehicle. The plurality of air springs 22, 24 includes a pair of front air springs 22 and a pair of rear air springs 24. The front air springs 22 are disposed spaced from one another and interconnects the vehicle and the front wheels of the vehicle for dampening relative forces between the vehicle and the front wheels. In addition, the front air springs 22 raise and lower the front end of the vehicle. Similar to the front air springs 22, the rear air springs 24 are spaced from one another and spaced from the front air springs 22. The rear air springs 24 interconnect the vehicle and the rear wheels of the vehicle for dampening relative forces between the vehicle and the rear wheels. In addition, the rear air springs 24 raise and lower the rear end of the vehicle.

The concurrent leveling system 20 includes a pressurized air source 26 disposed in fluid communication with the air springs 22, 24 for supplying air to the air springs 22, 24. A manifold block 28, having a body 30, is disposed between the air springs 22, 24 and the pressurized air source 26 for controlling which air springs 22, 24 are filled and emptied. The manifold block 28 includes a plurality of pneumatic valves 32, 34, 36, 38, 44, 46, 48, 50, 52, 54 disposed in fluid communication with the air springs 22, 24 and the pressurized air source 26 for controlling the fluid flow from the pressurized air source 26 to the air springs 22, 24. The pressurized air source 26 including a reservoir tank 56 and a compressor 58 for containing and conveying air to the manifold block 28 and the air springs 22, 24. It should be appreciated that the pressurized air source 26 may include the reservoir tank 56, the compressor 58, and an exhaust port 68. Alternatively, the pressurized air source 26 could include other components capable of providing pressurized air or only include the reservoir tank 56 and the compressor 58.

It should be appreciated that the concurrent leveling system 20 can include at least one pressure sensor 60 being electrically connected to the air springs 22, 24 for monitoring and determining the pressure in the concurrent leveling system 20. The pressure sensor is disposed in the manifold block 28 and electrically connected to an electronic control unit 62 for measuring the pressure in the manifold block 28, the pressurized air source 26, and/or the air springs 22, 24. In order to obtain individual reading of each of the air springs 22, 24 or the reservoir tank 56, the manifold block 28 may be evacuated and the pneumatic valves 32 (LF, RF), 34 (RR, LR), 36, or 38 may be momentarily opened.

The electronic control unit 62 is attached to the manifold block 28. The electronic control unit 62 is electrically connected to the pneumatic valves 32, 34, 36, 38, 44, 52, 94, the pressure sensor, and the compressor 58 for controlling and operating the compressor 58 and the pneumatic valves 32, 34, 36, 38, 44, 52, 54, 94 of the manifold block 28 to control the flow of the air from the compressor 58, through the manifold block 28, to the air springs 22, 24 to vary the height of the vehicle. Alternatively, the electronic control unit 62 can operate the compressor 58 and the pneumatic valves 32, 34, 36, 38, 44, 52, 94 to empty the air springs 22, 24. The height varying capabilities of the concurrent leveling system 20 can be used to perform functions such as maintaining the vehicle ride height due to load variation, lowering the vehicle at speed to provide for improved fuel economy, lowering the vehicle to provide for easy in entering and exiting the vehicle, and for adjusting the height of the respective sides of the vehicle for compensating for side-to-side load variation of the vehicle.

The compressor 58 defines a compressor air inlet 64 and a primary outlet 66. The compressor air inlet 64 is being used for drawing air into the motor driven compressor 58. The primary outlet 66 is disposed in fluid communication with the manifold block 28 for drawing the air from the compressor 58 and supplying the air to the air springs 22, 24. The compressor 58 defines an exhaust outlet 68, spaced from the primary outlet 66, for relieving the air from the concurrent leveling system 20. It should be appreciated that an exhaust silencer 70 can be attached to the compressor 58 at the exhaust outlet 68 for reducing noise generated by the exhaust outlet 68. The compressor 58 includes an exhaust valve 72, disposed in fluid connection with the exhaust outlet 68 and in electric communication with the electronic control unit 62, for selectively opening and closing the exhaust valve 72 to allow the air to pass through the exhaust outlet 68.

The body 30 of the manifold block 28 defines an air feed inlet 74, having a generally circular shape, for receiving the air from the compressor 58 of the pressurized air source 26. A base pneumatic line 76 extends between the primary outlet 66 of the compressor 58 and the air feed inlet 74 of the body 30 for transferring the air from the primary outlet 66 of the compressor 58 to the body 30. The body 30 defines an external vent 78 for allowing the air to flow from the electronic control unit 62. A reservoir fill valve 80 is disposed in the reservoir tank 56 for providing air to the reservoir tank 56 from an external pressurized air source, not shown. It should be appreciated that a reservoir fill valve 80 may also be coupled to the manifold block 28 connecting directly to the reservoir inlet port 90.

The body 30 defines a plurality of suspension ports 82, 84, e.g. four suspension ports, each having a generally circular shape, adequately spaced from one another and in fluid communication with the air springs 22, 24 and the pressurized air source 26. The front suspension ports 82 are disposed in fluid communication with the front air springs 22. The rear suspension ports 84 are disposed in fluid communication with the rear air springs 24. A plurality of suspension valves 32, 34, e.g. four suspension valves, are connected to the suspension ports 82, 84 by way of internal passageways, not shown. The suspension valves 32, 34 include a pair of front suspension valves 32 and a pair of rear suspension valves 34. Each of the suspension valves 32, 34 defines a suspension valve orifice 86 having a generally circular shape and a first predetermined diameter $D_1$. The suspension valves 32, 34 are disposed in the suspension ports 82, 84 with the front suspension valves 32 being disposed in the front suspension ports 82 and the rear suspension valves 34 being disposed in the rear suspension ports 84 for inhibiting and allowing the air to be conveyed from the pressurized air source 26 through the manifold block 28. A plurality of suspension pneumatic lines 88 extends between the suspension ports 82, 84 and the air springs 22, 24 for conveying the air from the pressurized air source 26 through the manifold block 28 to the air springs 22, 24. The suspension valves 32, 34 are electrically connected to the electronic control unit 62 for selectively opening and closing the suspension valves 32, 34.

To provide high flows on exhaust for a four wheel air suspension system, the front suspension valves 32 and the rear suspension valves 34 are utilized—one per each corner of the vehicle. The front suspension valves 32 and the rear suspension valves 34 can be utilized to exhaust a single axle at any given time in order to lower the vehicle equally from front of the vehicle to the rear of the vehicle. It should be understood that the disclosure is not limited to the type, number, and configuration of the suspension valves 32, 34 illustrated in the figures and discussed herein and could instead utilize any designs which isolates the manifold block 28 from the air springs 22, 24.

The reservoir tank 56 may be used to store compressed air received from the compressor 58 for being distributed to the air springs 22, 24. Because of the stored energy of the compressed air in the reservoir tank 56, the concurrent leveling system 20 can elevate the vehicle much quicker that it would be able to without the reservoir tank 56. The body 30 of the manifold block 28 defines a reservoir inlet port 90, having a generally circular shape, spaced from the suspension ports 82, 84 and in fluid communication with the suspension ports 82, 84 and the air feed inlet 74. A reservoir pneumatic line 92 extends from the reservoir inlet port 90 to the reservoir tank 56 for conveying the air from the reservoir tank 56 to the body 30.

The body 30 includes a manifold pressurization valve 36 and a reservoir valve 38 disposed spaced from one another. The manifold pressurization valve 36 and the reservoir valve 38 are disposed in line with the reservoir inlet port 90 in the manifold block 28 and are electrically connected to the electronic control unit 62. The manifold pressurization valve 36 and the reservoir valve 38 are controlled by the electronic control unit 62 for selectively inhibiting and allowing the air to be conveyed between the manifold block 28 and the pressurized air source 26. In other words, the manifold pressurization valve 36 is disposed in fluid communication with the suspension valves 32, 34 and the pressurized air source 26. The manifold pressurization valve 36 defines a manifold pressurization orifice having a pressurization orifice diameter that is much less than the first predetermined diameter $D_1$ for opening under high pressure to allow the compressed air from the pressurized reservoir tank 56 into the manifold block 28. This in turn momentarily increases the pressure in the manifold block 28 allowing the larger reservoir valve 38 to open since the differential pressure holding the valve closed approaches zero. The reservoir valve 38 defines a reservoir orifice having a reservoir orifice diameter that is greater than the manifold pressurization valve orifice diameter. The manifold pressurization valve 36 and the reservoir valve 38 are each electrically coupled with the electronic control unit 62 for selectively opening and closing the manifold pressurization valve 36 and the reservoir valve 38. The manifold pressurization valve 36 and the reservoir valve 38 are positioned in a parallel relationship to one another, allowing one or both to be closed at any given time. While both the manifold pressurization valve 36 and the reservoir valve 38 are disclosed, it should be appreciated that the manifold block 28 may only include just a single reservoir valve 38 with a specified orifice diameter.

The electronic control unit 62 controls a sequence of operating the manifold pressurization valve 36 and the plurality of suspension valves 32, 34 to equalize a high pressure differential across the plurality of suspensions valves 32, 34, 36, 38, 40, 44, 46, 48, 50, 52, 54, 72, 94 from the plurality of air springs 22, 24. Therefore, because the manifold pressurization valve 36 can operate under high pressure and equalize the pressure differential at each of the suspension valves 32, 34; the suspension valves 32, 34 that are used may have larger first predetermined diameter $D_1$ while negating the need for larger magnetic forces.

In addition, because of the presence of both the manifold pressurization valve 36 and the reservoir valve 38, three distinct airflow rates can be conveyed through the manifold pressurization valve 36 and the reservoir valve 38. The first flow rate can be defined as maximum flow wherein the manifold pressurization valve 36 and the reservoir valve 38 are both open. The second flow rate can be defined as manifold pressurization valve 36 half flow wherein the manifold pressurization valve 36 is opened and the reservoir valve 38 is closed. The third flow rate can be defined as reservoir valve 38 half flow wherein the reservoir valve 38 is opened and the manifold pressurization valve 36 is closed. It should be appreciated that under certain operating conditions, it can be desirable to utilize different airflow rate into the air spring to fill the air springs 22, 24 at faster or slower rates.

Figure 2:
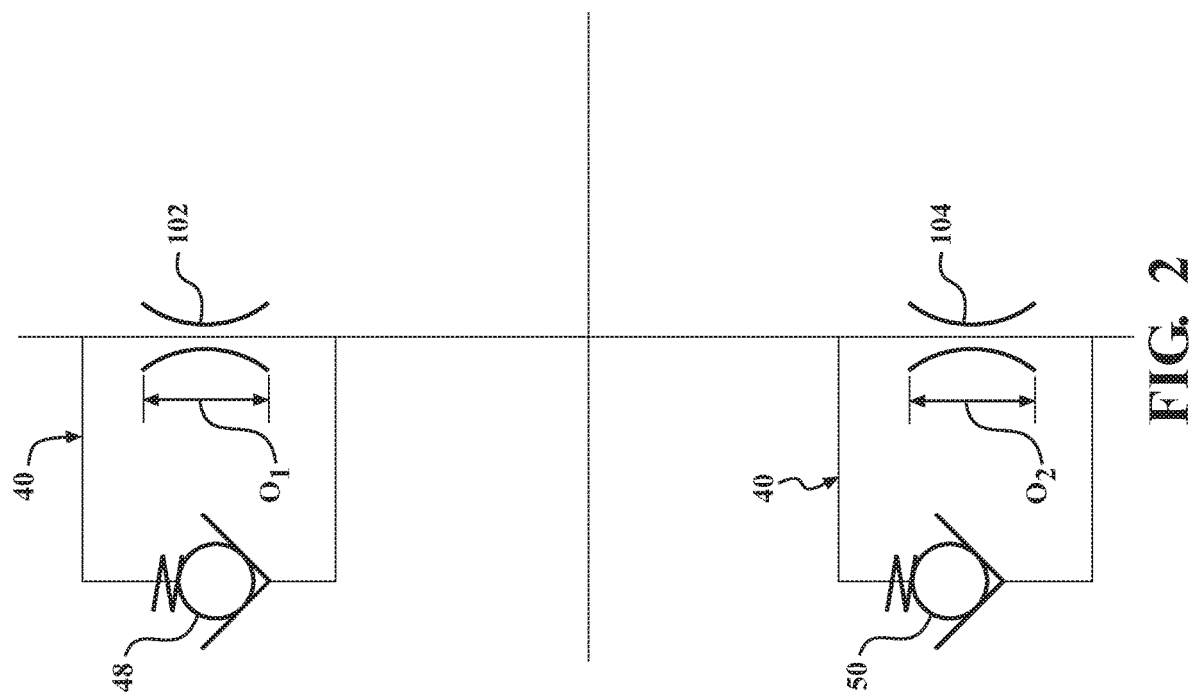
FIG. 2 is an enlarged schematic view of the at least one restrictor including the first check valve, the first blocker valve orifice, the second check valve, and the second blocker valve orifice shown in FIG. 1.

FIG. 1 illustrates a concurrent leveling system 20 wherein a piloted exhaust valve and dryer isolation valve, not shown, are included in the pressurized air source 26. This system has internal restriction that require a minimum airflow to maintain pilot valve activation pressure. As best illustrated in FIG. 1, the body 30 of the manifold block 28 includes at least one restrictor valve 40, disposed in series with the front suspension valves 32 and in fluid communication with the front suspension valves 32, for reducing fluid back flow to allow the vehicle to be lowered in nominal loading conditions. An enlarged view of the at least one restrictor valve 40 is shown in FIG. 2. As illustrated in FIG. 2, the at least one restrictor valve 40 includes a first check valve 48, a first blocker valve orifice 102 defining a first orifice diameter $O_1$, a second check valve 50, and a second blocker valve orifice 104 defining a second orifice diameter $O_2$. For most of the vehicle, the front end of the vehicle is the heaviest largely due to the location of the engine and transmission. Accordingly, when lowering the height of the vehicle, the heavy front end of the vehicle causes high pressure building in the manifold block 28. These high pressures do not permit the lighter rear end of the vehicle to be lowered at the same rate as the front end. The same situation can happen in reverse when raising the height of the vehicle. In other words, when raising the height of the vehicle, due to the weight difference between the front end and the rear end of the vehicle, the rear air springs 24 will raise to their maximum stroke height or nearly to the top before the front end start to raise any significant amount. It should be appreciated that the first blocker valve orifice 102 and the second blocker valve orifices 104 can be independently sized in accordance with the relative size of the first predetermined diameter $D_1$ of the suspension valve orifice 86 to assure equivalent airflow and thus providing smooth, level raising or lowering of the vehicle. It should also be appreciated that the first check valve 48 and the second check valve 50 will allow unimpeded flow in one direction to allow the overall airflow to balance between the axles. By implementing the at least one restrictor valve 40, which can now regulate the relative airflow from each axle, the concurrent leveling system 20 is able to smoothly raise and lower the height of the vehicle in nominal conditions without switching the front and rear suspension valves 32, 34. Furthermore, since a minimum airflow is required in this embodiment to keep the piloted dryer isolation valve operational, a bypass valve 52 is incorporated in parallel with the restrictor orifice 102. The bypass valve 52 may also be utilized, at anytime, when a single front axle lowering is needed. It should be noted that since the rear suspension valve 34 allows unrestricted airflow through the second check valve 50 in the unrestricted flow direction, no additional bypass valve is required to maintain a minimum flow rate from the rear axle as required by the pressurized air source 26 of the concurrent leveling system 20.

The manifold block 28 also includes a boost valve 44 electrically coupled to and controlled by the electronic control unit 62 and the boost line 100 extends between the reservoir tank 56 and the boost inlet 96 for selectively directly connecting the reservoir tank 56 and the boost inlet 96 of the compressor 58. Air from the reservoir tank 56 can be used to increase the output of the compressor 58 and, consequently, filing the air springs 22, 24 more quickly than without the boost. The boost valve 44 is electrically connected to the electronic control unit 62 for selectively opening and closing the boost valve 44. The manifold block 28 includes a boost check valve 46 disposed between the boost valve 44 and the boost port 98 to allow air flow from the reservoir tank 56 through the boost valve 44 to the boost port 98 and prevent back air flow from the boost port 98 toward the boost valve 44.

Figure 3:
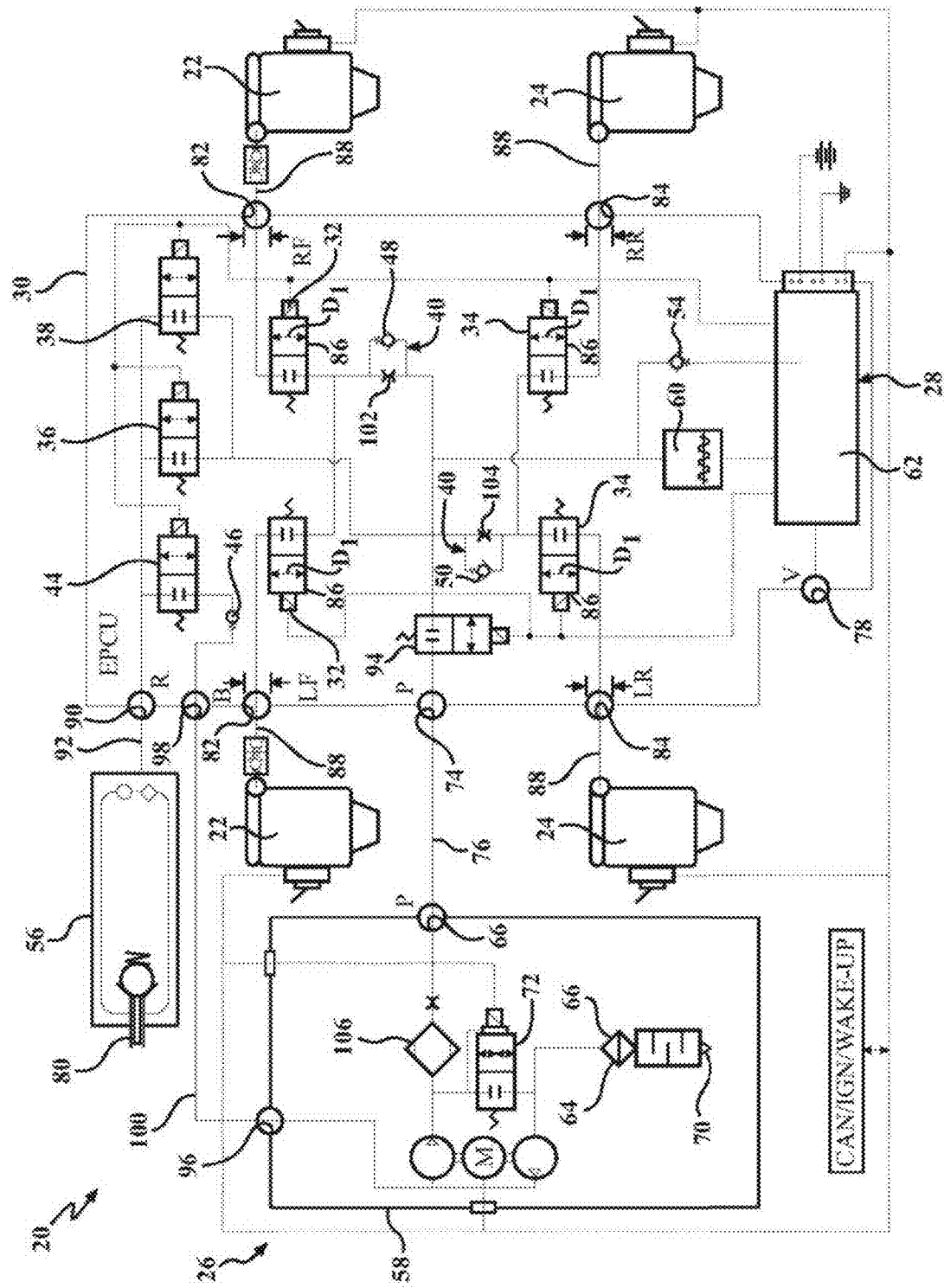
FIG. 3 is a schematic view of an alternative embodiment of the concurrent leveling system.
Figure 4:
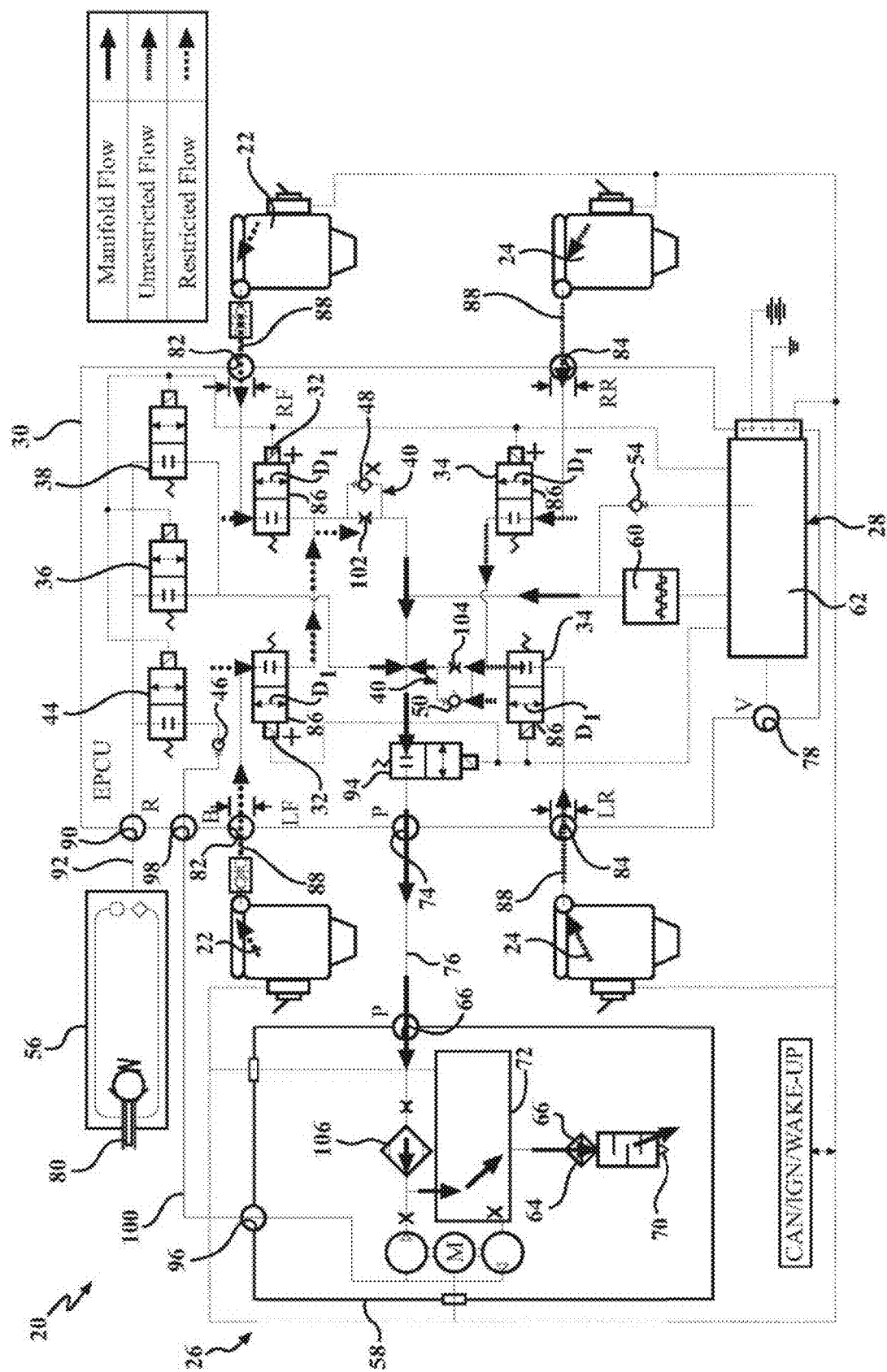
FIG. 4 is a schematic view illustrating the air flow during the current lowering for the concurrent leveling system shown in FIG. 3.
Figure 5:
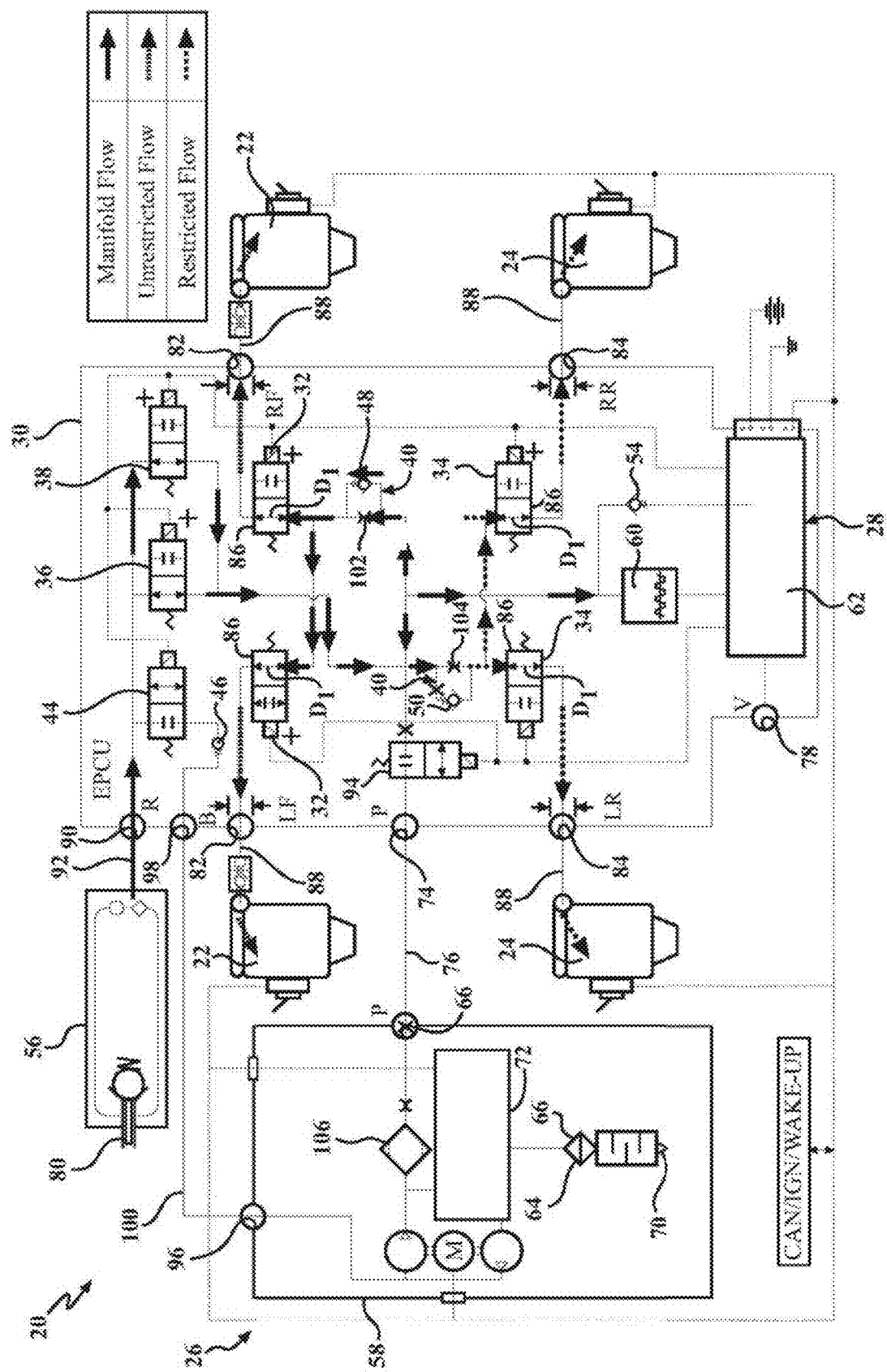
FIG. 5 is a schematic view illustrating the air flow during the current raising for the concurrent leveling system shown in FIG. 3.

FIGS. 3-5 illustrate an alternative embodiment of the present invention. The concurrent leveling system 20, as illustrated in FIGS. 3-5, uses a higher flow pressurized air source 26 that does not require a minimum airflow. The concurrent leveling system 20 in accordance with the present invention may further include a dryer 106 including a dryer isolation valve. The dryer 106 is disposed between the pressurized air source 26 and the manifold block 28. It should be appreciated that the dryer 106 can be disposed in fluid communication with the primary outlet 66 of the compressor 58 of the pressurized air source 26 and the manifold block 28 for reducing moisture content of the air as the air being supplied from the pressurized air source 26 to the manifold block 28. The dryer 106 may include a normally closed dryer isolation valve disposed in line with the compressor 58. Specifically, the normally closed dryer isolation valve can be disposed at the compressor air inlet 64; however, it can alternatively be integrated into the compressor 58. The normally closed dryer isolation valve can also be electrically coupled to the electronic control unit 62 for selectively opening and closing the normally closed dryer isolation valve. When an individual pressure reading is required of either the reservoir tank 56 or of any combination of the air springs 22, 24, the normally closed dryer isolation valve can remain closed thereby isolating the volume of the dryer 106 from the manifold block 28. Since the manifold block 28 consists largely of small drilled holes connecting the components together, with the normally closed dryer isolation valve being closed, there is very little air volume exposed to the pressure sensor as opposed to the much larger volume of the manifold block 28, the dryer 106, and base pneumatic line 76 without the normally closed dryer isolation valve. This allows the pressure reading of a specific device to stabilize almost instantaneously and with very little air volume loss, thus making the pressure readings much faster and more efficient. Accordingly, utilization of the normally closed dryer isolation valve can allow the concurrent leveling system 20 to respond much faster and more efficient in changing pressure condition.

The concurrent leveling system 20 as shown in FIGS. 3-5 may require higher flows on exhaust due to minimum flow rates required by the dryer 106 as well as for customer requirements. Additionally, overall system exhaust flow is typically controlled by the size of the dryer 106 (i.e., orifice of the dryer 106).

As shown in FIG. 3, the manifold block 28 includes a dryer isolation valve 94 disposed between the air feed inlet 74 and the at least one restrictor valve 40. The dryer isolation valve 94 is in series with the first check valve 48 and the front suspension valves 32 to improve airflow to the front air springs 22 when raising the vehicle while airflow is restricted to the rear air springs 24. The second blocker valve orifice 104 is thus carefully sized to keep the vehicle level as the vehicle is being raised. Conversely, the dryer isolation valve 94 is also in series with the second check valve 50 and the rear suspension valves 34 to improve airflow from the rear air springs 24 when lowering the vehicle while airflow is restricted to the front air springs 24. The first blocker valve orifice 102 is thus carefully sized to keep the vehicle level as the vehicle is being lowered. The dryer isolation valve 94 is also electrically connected to the electronic control unit 62 for controlling and operating the dryer isolation valve 94 to control the exhaust flow to the compressor 58, from the air springs 22, 24 through the manifold block 28, to lower the height of the vehicle. In this embodiment, the compressor 58 in the concurrent leveling system 20 is a high flow compressor 58. The high flow compressor 58 has less restriction for exhaust flow and has no minimum exhaust flow requirements due to an improved, direct acting exhaust valve, not shown, that does not require a pilot operated secondary valve thereby permitting the bypass valve 52 to be removed from the manifold block 28. However, to obtain these flow improvements, the dryer isolation valve 94 is removed from the pressurized air source 26 and added to the manifold block 28. The addition of the dryer isolation valve 94 still maintains the 8-valve packaging limit of the compact design since, as previously noted, the bypass valve 52 is removed. In addition, to maintain the desired improved exhaust flow, a single stage dryer isolation valve 94 could not incorporate an orifice large enough to support this new requirement. Accordingly, a unique two-stage, normally closed valve, adapted for pneumatic applications, is incorporated. The normally closed dryer isolation valve 94 prevents constant communication with the compressor 58 that previously served that function. The manifold block 28 also includes a pressure relief control valve 54 disposed between the first check valve 48 and the first blocker valve orifice 102 and the second check valve 50 and the second blocker valve orifice 104 for limiting manifold pressure. Since the dryer isolation valve 94 is normally closed thereby prevents constant communication with the compressor 58, the pressure relief control valve 54 is used for releasing pressure inside the manifold block 28 should it become necessary.

In operation, air may be released from the front air springs 22 and the rear air springs 24 to achieve a concurrent lowering of the height of the vehicle. As best illustrated in FIG. 4, during the concurrent lowering of the vehicle, air is release from both the front air springs 22 and the rear air springs 24 to lower the height of the vehicle. The air released from the front air springs 22 travels through the front suspension valves 32 and through the first blocker valve orifice 102. Since the first check valve 48 only allows one-way airflow to the air springs 22, 24, the air released from the front air springs 22 can only flow through the first blocker valve orifice 102. At the same time, the air from the rear air springs 24 is also released. The air released from the rear air springs 24 travels through the rear suspension valves 34, the second check valve 50, and the second blocker valve orifice 104 with much less airflow restriction. The dryer isolation valve 94 is open to allow the air released from the front air springs 22 and the rear air springs 24 to exit the manifold block 28 through the air feed inlet 74 of the manifold block 28 to the compressor 58. The air released from the front air springs 22 and the rear air springs 24 travels from the primary outlet 66 of the compressor 58 to the exhaust outlet 68 of the compressor 58 to exit the concurrent leveling system 20 thereby lowering the height of the vehicle.

The height of the vehicle can be concurrently raised by introducing air, from the pressurized air source 26, e.g. the reservoir tank 56, to the front air springs 22 and the rear air springs 24. As best illustrated in FIG. 5, during the concurrent raising of the vehicle, air is first introduced to the concurrent leveling system 20 from the pressurized air source 26. The air flows through the manifold pressurization valve 36 and a reservoir valve 38 to the front air springs 22 and the rear air springs 24. To raise the height of the front end of the vehicle, the air travels through the first check valve 48, the first blocker valve orifice 102, and the front suspension valves 32 to the front air springs 22 for raising the height of the front end of the vehicle with much less airflow restriction. To raise the height of the rear end of the vehicle, the air travels through the second blocker valve orifice 104 and the rear suspension valves 34 to the rear air springs 24 for raising the height of the rear end of the vehicle.

Figure 6:
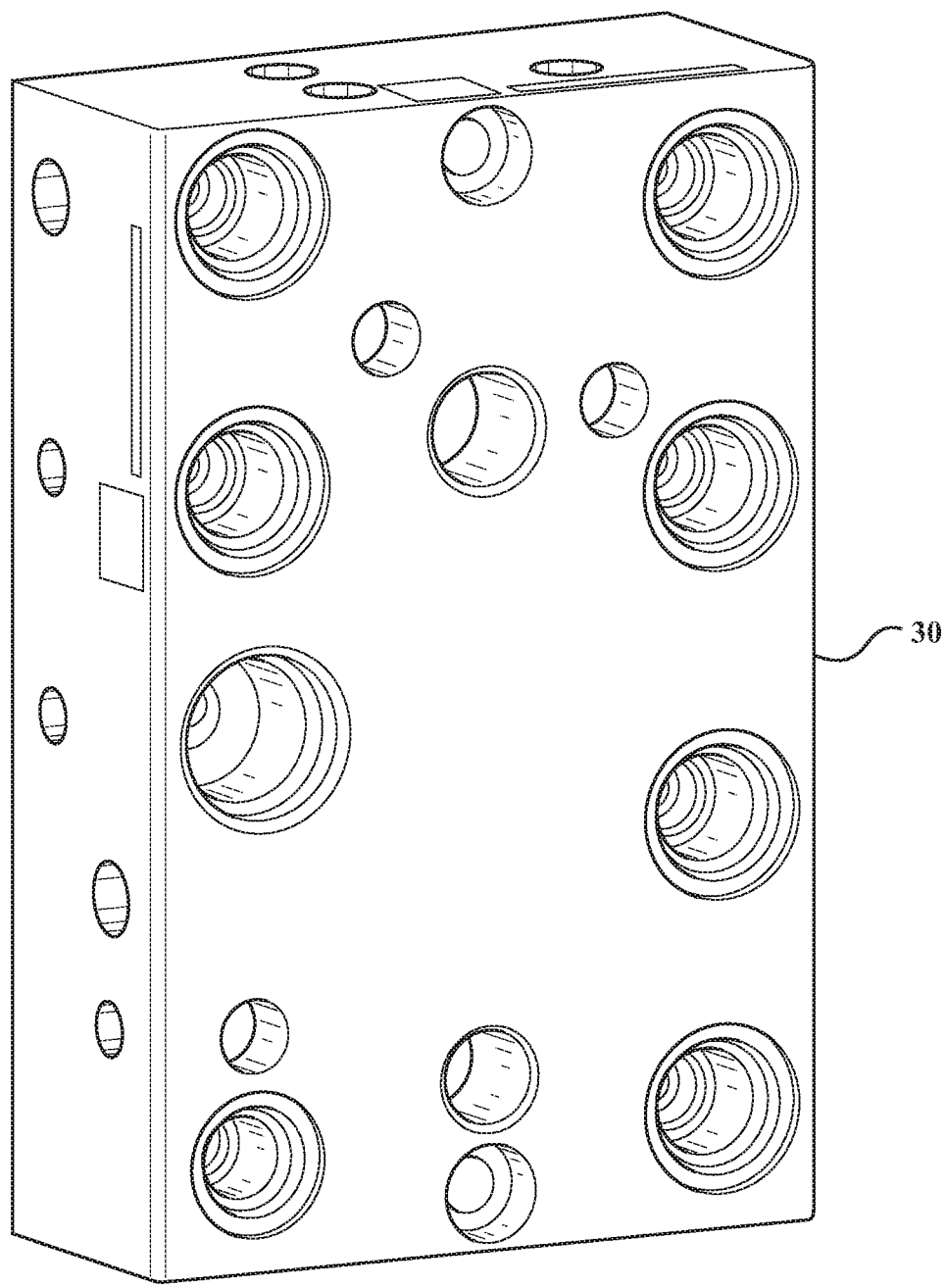
FIG. 6 is a perspective view of the manifold block.
Figure 7:
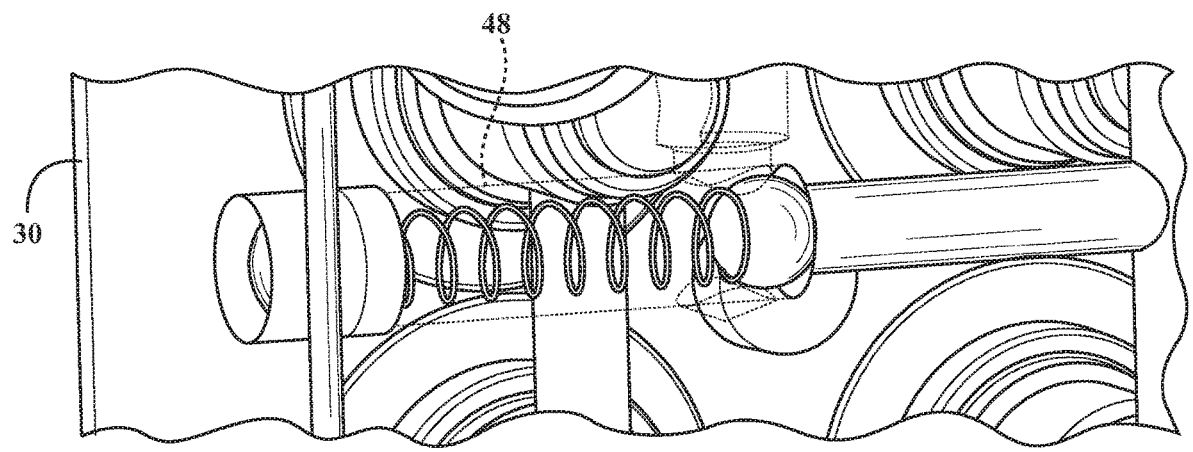
FIG. 7 is a cross-sectional perspective view of the first check valve of the manifold block.
Figure 8:
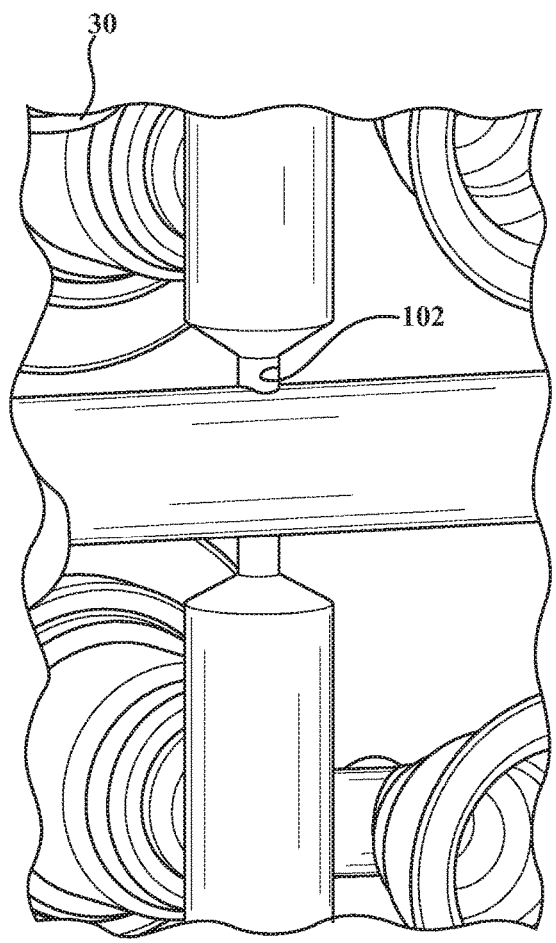
FIG. 8 is a cross-sectional perspective view of the first blocker valve orifice.

It is a further aspect of the present invention to provide a manifold block 28 for a concurrent leveling system 20 for the vehicle. As best shown in FIGS. 6-8, the manifold block 28 includes a body 30 defining an air feed inlet 74 disposed between the air springs 22, 24 and a pressurized air source 26 for controlling the fluid flow from the pressurized air source 26 to the air springs 22, 24. The body 30 including a plurality of state-of-the art, single stage, pneumatic suspension valves 32, 34 having a pair of front suspension valves 32 and a pair of rear suspension valves 34. Each one of the suspension valves 32, 34 defines a suspension valve orifice 86 having a first predetermined diameter $D_1$ for inhibiting and allowing the air to be conveyed from the pressurized air source 26 through the manifold block 28. The body 30 including at least one restrictor valve 40 disposed in series with the front suspension valves 32 and in fluid communication with the front suspension valves 32 for reducing fluid back flow to allow the vehicle to be lowered smoothly, while maintaining constant level in nominal loading conditions.

The at least one restrictor valve 40 includes a first check valve 48 and a first blocker valve orifice 102 defining a first orifice diameter $O_1$. The first check valve 48 and the first blocker valve orifice 102 are disposed parallel to one another, in series with the front suspension valves 32, between the air feed inlet 74 of the body 30 and the front suspension valves 32 and in fluid communication with the air feed inlet 74 and the front suspension valves 32 through an optional dryer isolation valve 94. It should be appreciated that the first orifice diameter $O_1$ can be equal to, smaller than, or greater than the first predetermined diameter $D_1$. The first check valve 48 permits the forward flow of air from either the compressor 58 or the reservoir tank 56 to the front suspension valves 32 without any impedance to the flow of the air. Accordingly, this allows the faster filing of the front air springs 22; however, it throttles the exhaust air flow from the air springs 22, 24 when lowering the vehicle. This keeps the back pressure in the manifold block 28 at a level that can be balanced with the rear axle flow rate allowing the vehicle to be lowered and kept at acceptable angles relative to the ground without continuously turning the suspension valves 32, 34 on or off.

In addition to the first check valve 48 and the first blocker valve orifice 102, the at least one restrictor valve 40 includes a second check valve 50 and a second blocker valve orifice 104 defining a second orifice diameter $O_2$. The second check valve 50 and the second blocker valve orifice 104 being disposed parallel to one another and in series with the rear suspension valves 34 being located between the manifold pressurization valve 36, the reservoir valve 38, and the rear suspension valves 34. It should be appreciated that second orifice diameter $O_2$ may be larger than the first predetermined diameter $D_1$. The second check valve 50 and the second blocker valve orifice 104 are arranged such that the second check valve 50 is shutting off the flow of the air in the fill direction rather than the exhaust direction. This forces the flow of the air through the second blocker orifice for the rear air springs 24 thereby lowering the rise rate of the rear of the vehicle to closely match the front of the vehicle. As best shown in FIG. 7, a very low cost and efficient first and the second check valves 48, 50 can be formed from a seat created by the drill of a stepped bore. As best shown in FIG. 8, a very low cost and efficient first blocker valve orifice 102 and second blocker valve orifice 104 can be formed by precision drilled holes.

Figure 9:
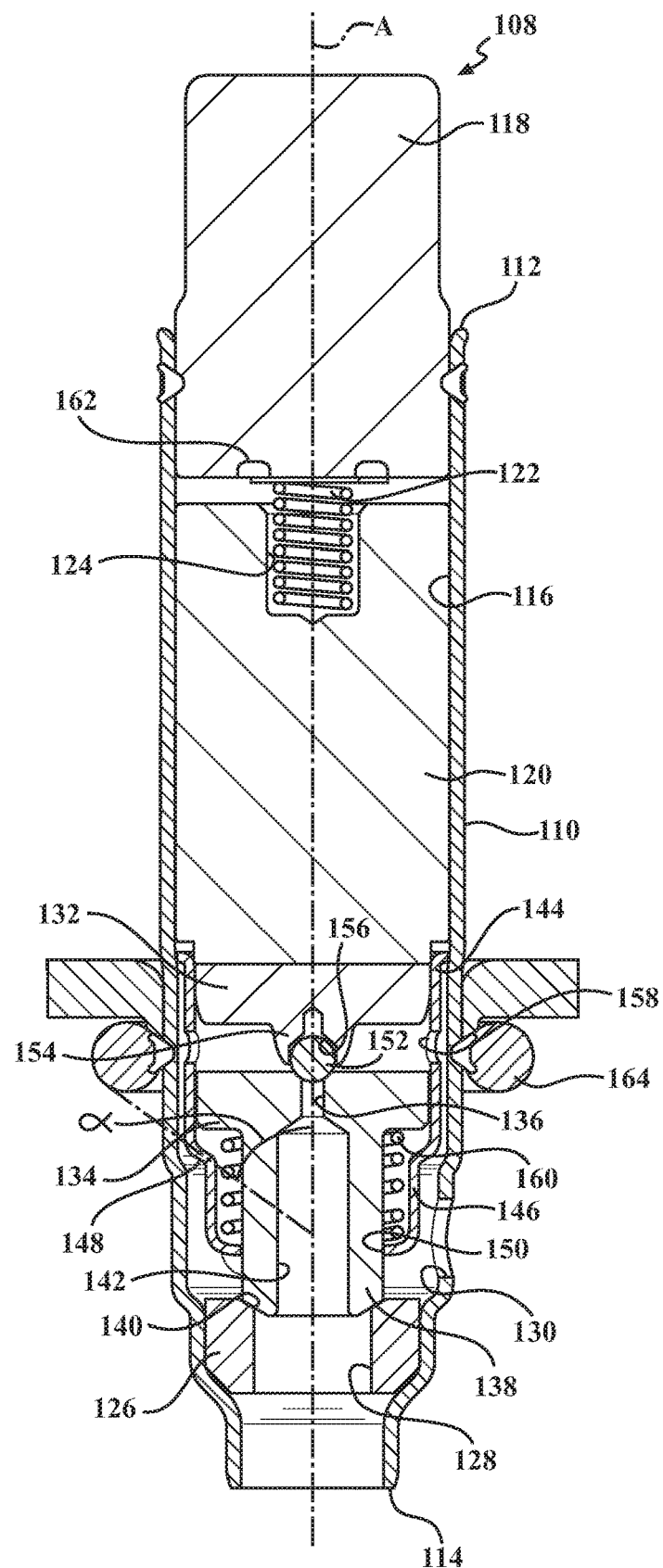
FIG. 9 is a cross-sectional perspective view of the pneumatic valve assembly.

It is a further aspect of the present invention to provide a pneumatic valve assembly 108. As best shown in FIG. 9, the pneumatic valve assembly 108 is a two-stage normally closed valve. The pneumatic valve assembly 108 includes a housing 110, having a generally cylindrical shape, disposed on a center axis A and extending between a first opened end 112 and a second opened end 114. The housing 110 defines a channel 116 extending along the center axis A between the first opened end 112 and the second opened end 114. A stator 118, having a generally cylindrical shape, is attached to the housing 110. It should be appreciated that the stator 118 can be disposed in the channel 116 and attached to the first opened end 112 of the housing 110. An armature 120 is slidably disposed in the channel 116, spaced from the stator 118, for axial movement along the center axis A. At least one coil is disposed about the stator 118 and the armature 120 for generating a magnetic field. It should be appreciated that the stator 118 and the armature 120 are made from a stainless steel to prevent internal corrosion from exposure to air.

A first elastic member 122 is disposed between the stator 118 and the armature 120. The first elastic member 122 is compressed between the stator 118 and the armature 120 to bias the armature 120 axially away from the stator 118. It should be appreciated that the first elastic member 122 can be a spring extending helically between the stator 118 and the armature 120 to bias the armature 120 axially away from the stator 118. The armature 120 defines a bore 124, having a generally cylindrical shape, disposed adjacent to the stator 118 for receiving the first elastic member 122.

A valve seat 126, having a generally circular shape, is disposed in the channel 116 and attached to the second opened end 114 of the housing 110. The valve seat 126 defines an aperture 128, having a generally circular shape, disposed on the center axis A for allowing fluid to flow through the second opened end 114 and the valve seat 126. The housing 110 defines at least one hole 130 disposed adjacent to the second opened end 114 between the valve seat 126 and the armature 120 and in fluid communication with the channel 116 to allow fluid flow from the second opened end 114 through the housing 110.

At least one plunger 132, 134 is disposed in the channel 116 extending along the center axis A between the valve seat 126 and the armature 120. The at least one plunger 132, 134 is attached to the armature 120 for controlling fluid flow through the aperture 128 of the restrictor. The at least one plunger 132, 134 includes a first plunger 132 and a second plunger 134 disposed in tandem and spaced from one another in the channel 116 and extending along the center axis A for movement with the armature 120 in response to the magnetic field generated by the coil. The first plunger 132 is disposed in the channel 116, spaced from the second opened end 114, and attached to the armature 120 for movement with the armature 120 in response to the first magnetic field. The second plunger 134 is disposed in the channel 116, spaced from the second opened end 114, and adjacent to the first plunger 132 for moving with the armature 120 in response to the magnetic field generated by the coil. The second plunger 134 defines an opening 136, having a generally circular shape, and extends along the center axis A for allowing fluid flow through the second plunger 134. The second plunger 134 includes a projection 138 disposed about the opening 136 and extends outwardly from the second plunger 134 and annularly about the center axis A toward the second opened end 114 to a distal end 140 to engage the valve seat 126. The projection 138 defines a conduit 142 between the projection 138 and the second plunger 134. The conduit 142 is disposed in fluid communication with the opening 136 and the hole 130 for allowing fluid flow through the second plunger 134. The distal end 140 of the projection 138 is chamfered for engaging the valve seat 126. It should be appreciated that the second plunger 134 and the projection 138 is made from stainless steel to prevent internal corrosion from exposure to air.

A cap 144, 146, 148 is disposed in the channel 116 and spaced from the housing 110 and attached to the armature 120. The cap 144, 146, 148 extends annularly about the first plunger 132 and the second plunger 134 for axial movement with the armature 120 in response to the magnetic field and to retain the first plunger 132 and the second plunger 134 in the channel 116. The cap 144, 146, 148 includes a top portion 144 attached to the armature 120 and a bottom portion 146 defining a perforation 150 to receive the projection 138 to allow the distal end 140 to engage the valve seat 126 to prevent fluid flow through the hole 130 of the valve seat 126. An intermediate stop portion 148 extends at an oblique angle α relative to the center axis A between the top portion 144 and the bottom portion 146 connecting the top portion 144 with the bottom portion 146 to engage the second plunger 134 in response to the magnetic field. It should be appreciated the oblique angle should be between 0° and 90° relative to the center axis.

A blocking member 152 is disposed between the first plunger 132 and the second plunger 134 and attached to the first plunger 132 covering the opening 136 of the second plunger 134 to prevent fluid flow through the opening 136 of the second plunger 134. It should be appreciated that the blocking member 152 is a ball. The blocking member 152 is movable with the armature 120 in response to the magnetic field generated by the coil from a closed position to an opened position. The closed position is defined as the blocking member 152 abutting the opening 136 of the second plunger 134 to prevent fluid flow through the second plunger 134. The opened position is defined as the blocking member 152 and the armature 120 being in abutment relationship with the stator 118 to allow fluid to flow through the opening 136. The first plunger 132 includes a protrusion 154 disposed in the channel 116 and extends outwardly from the first plunger 132 along the center axis A toward the second plunger 134. The protrusion 154 defines a cavity 156, having a generally hemispherical shape, to receive the blocking member 152.

The top portion 144 of the cap 144, 146, 148 defines at least one slot 158 disposed between the first plunger 132 and the second plunger 134 for allowing fluid flow through the cap 144, 146, 148 in response to the blocking member 152 being in the opened position. A second elastic member 160 is disposed in the cap 144, 146, 148 between the bottom portion 146 of the cap 144, 146, 148 and the second plunger 134 for moving the second plunger 134 from a first position to a second position in response to the magnetic field generated by the coil. The first position is defined as the distal end 140 of the projection 138 being in abutment relationship with the valve seat 126 to prevent fluid flow through the valve seat 126. The second position is defined as the distal end 140 of the projection 138 being axially spaced from the valve seat 126 allowing an unrestricted fluid flow through the second opened end 114 and the hole 130. It should be appreciated that the second elastic member 160 can be a spring and extending helically about the projection 138 of the second plunger 134 to moving the second plunger 134 from the first position to the second position. At least one dampener 162 disposed in the channel 116 and attached to the stator 118 for providing quiet operation of the armature 120. The pneumatic valve assembly 108 includes a ring 164 disposed annularly about the housing 110 to prevent external leakage.

The pneumatic valve assembly 108 is typically used in a manifold block 28 for controlling the fluid flow in the manifold block 28. The second opened end 114 of the housing 110 is disposed in fluid communication with an inlet of the manifold block 28. The at least one hole 130 of the housing 110 is disposed in fluid communication with an outlet of the manifold block 28. The pneumatic valve assembly 108 is used to regulate the fluid flow between the inlet and the outlet of the manifold block 28.

In operation, the pneumatic valve assembly 108 is normally closed. In other words, the distal end 140 of the second plunger 134 is disposed in engagement with the valve seat 126 and the blocking member 152 is disposed in engagement with the opening 136 thereby preventing fluid flow between the inlet and the outlet of the manifold block 28 through the housing 110. To allow fluid flow through housing 110, an electric current is send through the coils, not shown, thereby generating a magnetic field. The magnetic flux generated is concentrated at the space between the stator 118 and the armature 120. In response to the magnetic field generated and the magnetic flux, the armature 120 is moved axially toward the stator 118. In response to the axial movement of the armature 120, the first plunger 132 and the blocking member 152 is moved from the closed position to the opened position thereby establishing fluid communication through the opening 136 allowing the fluid to flow from the inlet of the manifold block 28, through the opening 136, the slots 158, and the hole 130 of the housing 110, to the outlet of the manifold block 28. In addition, as the armature 120 and the first plunger 132 move toward the stator 118, the cap 144, 146, 148 also moves axially toward the stator 118 with the armature 120. As a result, the intermediate stop portion 148 of the cap 144, 146, 148 engages the second plunger 134 and axially moves the second plunger 134 from the first position to the second position to allow unrestricted fluid flow from the inlet of the manifold block 28, through the second opened end 114 and the hole 130 of the housing 110, to the outlet of the manifold block 28.

The pneumatic valve assembly 108 in accordance with the present invention utilizes a single magnetic force to move the first plunger 132 from the closed position to the opened position and subsequently move the second plunger 134 from the first position to the second position. Thus, the two-stage design of the pneumatic valve assembly is capable of opening a seat with the diameter of the aperture 128 being larger than that of a single stage valve design. The diameter of the aperture 128 may be over twice as large as the first predetermined diameter $D_1$ of the front suspension valve 32 and the rear suspension valve 34 thereby providing over four times the flow area to minimize any internal backpressure while lowering the vehicle. In addition, the pneumatic valve assembly 108 provides for quiet operation as the first plunger 132 is moved from the closed position to the opened position and the second plunger 134 is moved from the first position to the second position.

Figure 10:
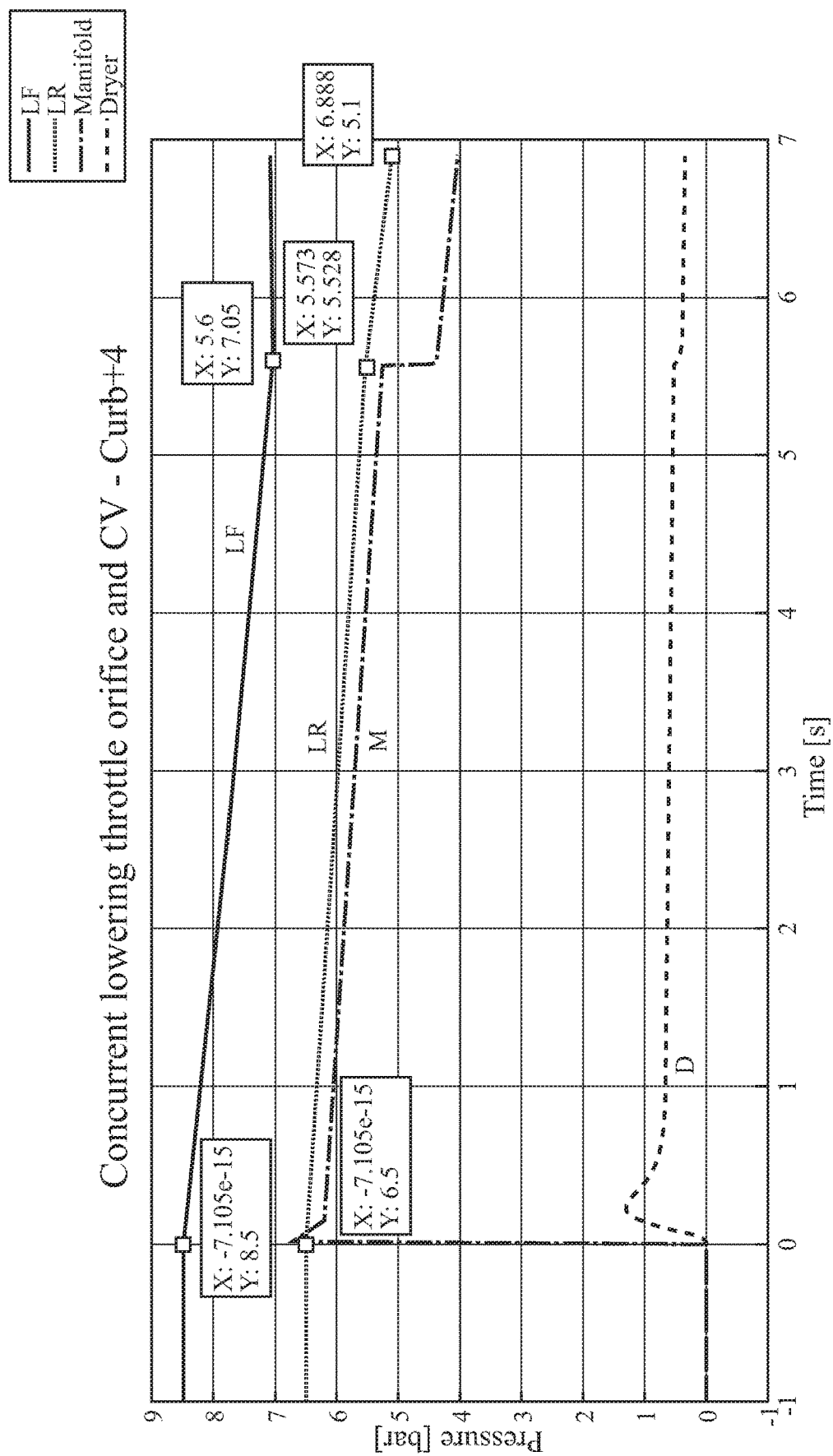
FIG. 10 is a graphical illustration of pressure vs. time for the air springs, the manifold block, and the dryer during concurrent lowering of the vehicle.

The concurrent leveling system 20 in accordance with the present invention is simulated in a program that accurately predicts vehicle behavior for various loading scenarios. FIG. 10 plots the pressure in the air springs 22, 24, the manifold block 28, and the dryer 106 against time during the concurrent lower process. As illustrated in FIG. 10, during the concurrent lowering process, the pressure in the manifold block 28 and the dryer 106 increases due to the air flow from the air springs 22, 24. In addition, there is a constant, smooth decrease in the pressures in both LF and LR air springs 22, 24 thus keeping a nominally loaded vehicle level during this process.

Figure 11:
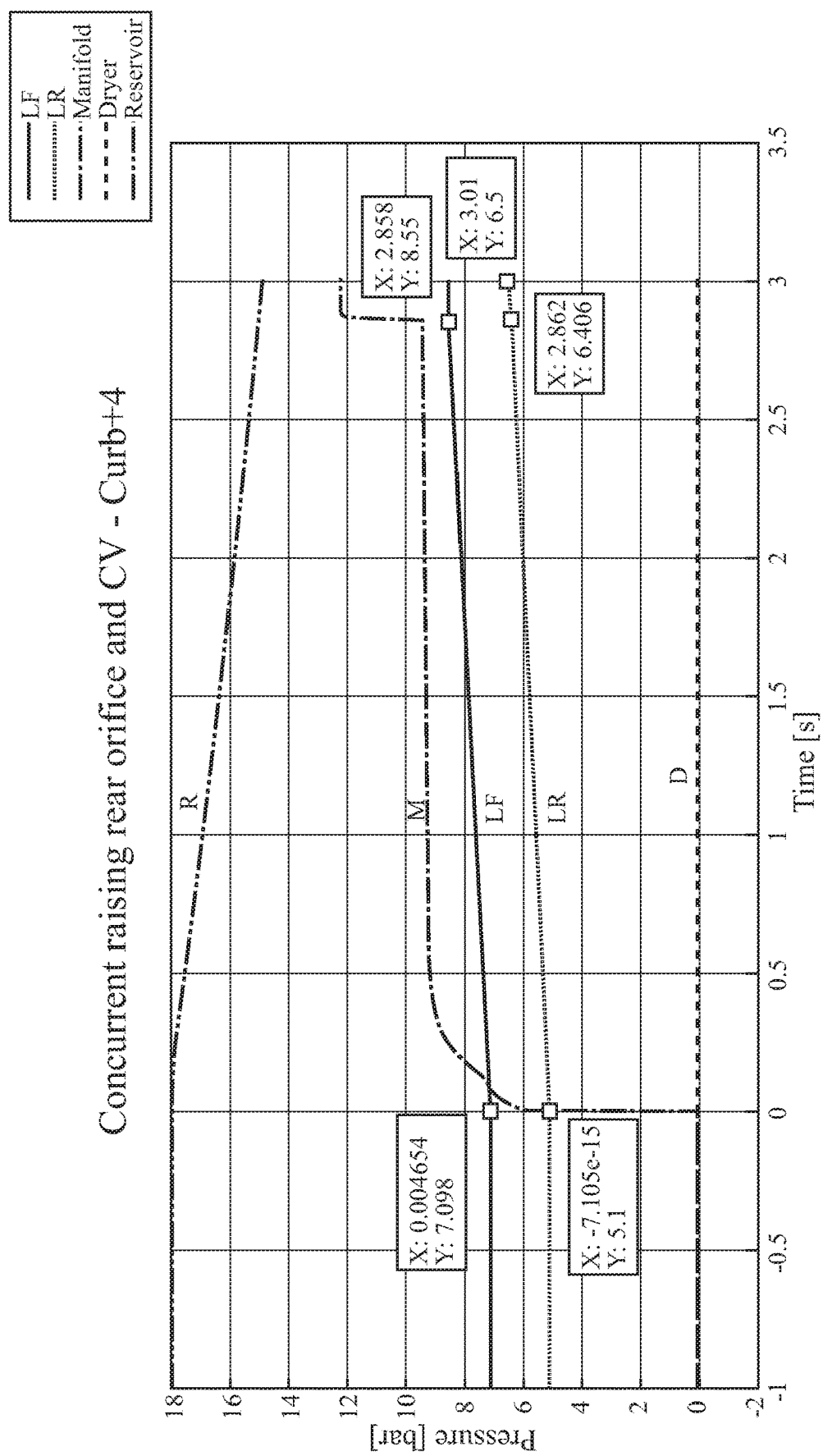
FIG. 11 is a graphical illustration of pressure vs. time for the air springs, the manifold block, and the dryer when concurrent raising the vehicle.

FIG. 11 plots the pressure in the air springs 22, 24, the manifold block 28, the pressurized air source 26 (the reservoir tank 56), and the dryer 106 against time during the concurrent raising process. As illustrated in FIG. 11, during the concurrent raising process, the pressure in the manifold block 28 and the air springs 22, 24 increase while the pressure inside the reservoir tank 56 decreases due to the air flow from the reservoir tank 56, through the manifold block 28, to the air springs 22, 24. The pressure in the dryer 106 remains to be zero because there is no airflow through the dryer 106 during the concurrent raising process as the dryer isolation valve 94 and the exhaust valve in the compressor, not shown, remain closed.

Obviously, many modifications and variations of the present invention are possible in light of the above teachings and may be practiced other than as specifically described within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A concurrent leveling system for a vehicle having a pair of front air springs and a pair of rear air springs, said concurrent leveling system comprising:
a pressurized air source for supplying air to said front air springs and said rear air springs; and
a manifold block having a body defining an air feed inlet disposed between the air springs and said pressurized air source for controlling the fluid flow from said pressurized air source to said air springs;
wherein said body of said manifold block includes a plurality of suspension valves having a pair of front suspension valves and a pair of rear suspension valves each defining a suspension valve orifice having a first predetermined diameter for inhibiting and allowing the air to be conveyed from said pressurized air source through said manifold block; and
said body includes at least one restrictor valve disposed in series with said front suspension valves and in fluid communication with said front suspension valves for reducing fluid back flow to allow the vehicle to be lowered in nominal loading conditions;
wherein said at least one restrictor valve includes a first check valve and a first blocker valve orifice defining a first orifice diameter with said first check valve and said first blocker valve orifice being disposed parallel to one another and in series with said front suspension valves between said air feed inlet of said body and said front suspension valves and in fluid communication with said air feed inlet and said front suspension valves for reducing fluid back flow;
wherein said at least one restrictor valve includes a second check valve and a second blocker valve orifice defining a second orifice diameter with said second check valve and said second blocker valve orifice being disposed parallel to one another and in series with said rear suspension valves between said air feed inlet of said body and said rear suspension valves and spaced from said first blocker valve orifice and in fluid communication with said air feed inlet and said rear suspension valves.

2. The concurrent leveling system as set forth in claim 1, wherein said first orifice diameter is equal to said first predetermined diameter.

3. The concurrent leveling system as set forth in claim 1, wherein said first orifice diameter is smaller than said first predetermined diameter.

4. The concurrent leveling system as set forth in claim 1, wherein said first orifice diameter is larger than said first predetermined diameter.

5. The concurrent leveling system as set forth in claim 1, wherein said second orifice diameter is larger than said first predetermined diameter.

6. The concurrent leveling system as set forth in claim 1, wherein said at least one restrictor valve further includes a bypass valve disposed parallel to said first check valve and said first blocker valve orifice and in fluid communication with said air feed inlet and said front suspension valves for restoring balance flow.

7. The concurrent leveling system as set forth in claim 1, wherein said body includes a dryer isolation valve disposed between said air feed inlet and said at least one restrictor valve and in series with said first check valve and said first blocker valve orifice and said second check valve and said second blocker valve orifice to maintain an improved exhausted flow.

8. A manifold block for a concurrent leveling system for a vehicle having a pair of front air springs and a pair of rear air springs, said manifold block comprising:
a body defining an air feed inlet disposed between the air springs and a pressurized air source for controlling the fluid flow from the pressurized air source to the air springs;
said body including a plurality of suspension valves having a pair of front suspension valves and
a pair of rear suspension valves each defining a suspension valve orifice having a first predetermined diameter for inhibiting and allowing the air to be conveyed from the pressurized air source through said manifold block; and
said body including at least one restrictor valve disposed in series with said front suspension valves and in fluid communication with said front suspension valves for reducing fluid back flow to allow the vehicle to be lowered in nominal loading conditions;
wherein said at least one restrictor valve includes a first check valve and a first blocker valve orifice defining a first orifice diameter with said first check valve and said first blocker valve orifice being disposed parallel to one another and in series with said front suspension valves between said air feed inlet of said body and said front suspension valves and in fluid communication with said air feed inlet and said front suspension valves for reducing fluid back flow;

wherein said at least one restrictor valve includes a second check valve and a second blocker valve orifice defining a second orifice diameter with said second check valve and said second blocker valve orifice being disposed parallel to one another and in series with said rear suspension valves between said air feed inlet of said body and said rear suspension valves and spaced from said first blocker valve orifice and in fluid communication with said air feed inlet and said rear suspension valves.

* * * * *